United States Patent [19]

Leung

[11] Patent Number: 4,762,880

[45] Date of Patent: Aug. 9, 1988

[54] WATER-BASED THERMOFORMING ADHESIVES

[75] Inventor: Pak T. Leung, Granger, Ind.

[73] Assignee: Uniroyal Plastics Co., Inc., Mishawaka, Ind.

[21] Appl. No.: 46,598

[22] Filed: May 5, 1987

[51] Int. Cl.$^4$ .................................. C08G 18/30
[52] U.S. Cl. ................................ 524/853; 524/873
[58] Field of Search .......................... 524/853, 873

[56] References Cited

U.S. PATENT DOCUMENTS

| | | | |
|---|---|---|---|
| 3,948,708 | 4/1976 | Doerer | 156/196 |
| 4,084,996 | 4/1978 | Wheeler | 156/257 |
| 4,225,372 | 9/1980 | Kinzler | 156/154 |
| 4,465,534 | 8/1984 | Zelkowtiz | 156/91 |
| 4,465,537 | 8/1984 | Coleman | 156/154 |
| 4,507,413 | 3/1985 | Thoma et al. | 524/839 |
| 4,526,828 | 7/1985 | Fogt et al. | 428/229 |
| 4,543,144 | 9/1985 | Thoma et al. | 524/839 |
| 4,643,785 | 2/1987 | Paynton | 156/101 |

*Primary Examiner*—John Kight
*Assistant Examiner*—S. A. Acquah
*Attorney, Agent, or Firm*—Pennie & Edmonds

[57] ABSTRACT

This invention presents new water-based adhesives suitable for use in thermoforming lamination systems. More particularly, this invention presents water-based adhesive-forming compositions comprising an aromatic polyurethane in water dispersion or emulsion and a compatible cross-linking agent; also includable in the compositions are thickening agents and pigments. These new adhesives, it has been found, exhibit bonding strengths and temperature resistance far superior to the solvent and water-based adhesives currently used in industrial applications, and are useful in thermoforming lamination processes. Also disclosed is a one-step thermoform lamination edge-folding process using the adhesive.

25 Claims, No Drawings

WATER-BASED THERMOFORMING ADHESIVES

TABLE OF CONTENTS

1. INTRODUCTION
2. BACKGROUND OF INVENTION
3. SUMMARY OF INVENTION
4. DETAILED DESCRIPTION OF THE INVENTION
   - 4.1. Water Based Adhesive-Forming Compositions
     - 4.1.1. Aromatic Polyurethanes
     - 4.1.2. Cross-Linking Agents
     - 4.1.3. Rheology Control Agents
     - 4.1.4. Pigments
     - 4.1.5. Compositions
   - 4.2. Use of Adhesive-Forming Compositions In Thermoforming Lamination Processes
5. EXAMPLES
   - 5.1. Thermoforming Adhesive Properties of a Standard Water-Based Adhesive
   - 5.2. Preparation of New Thermoforming Adhesive
   - 5.3. Thermoforming Properties of the New Adhesive
   - 5.4. Effect of Eliminating Polyisocyanate from the Adhesive
   - 5.5. Effect of Varying Polyisocyanate Content
   - 5.6. Stability of Mixed Adhesive
   - 5.7. Effect of Open Time or Adhesive Performance
   - 5.8. Effect of Heat Cycles
   - 5.9. Viscosity Versus Time Profile for the Adhesive
   - 5.10. Effect of Variation of Drying Conditions

1. INTRODUCTION

This invention presents new water-based adhesives suitable for use in thermoforming lamination systems. More particularly, this invention presents water-based adhesive-forming compositions comprising an aromatic polyurethane in-water dispersion or emulsion and a compatible cross-linking agent; also includable in the compositions are thickening agents and pigments. These new adhesives, it has been found, exhibit bonding strengths and temperature resistance far superior to the solvent and water-based adhesives currently used in industrial applications.

2. BACKGROUND OF INVENTION

Thermoforming or vacuum forming is essentially taking a piece of thermoplastic sheet, heating it to a point beyond its softening point, vacuuming it to a contoured surface, and cooling the formed sheet back down to below its softening point. A large variety of thermoplastic materials can be subjected to this treatment. Some of the common materials used in thermoforming are listed as follows:
High Impact Polystyrene (HIPS)
Acrylonitrile-Butadiene-Styrene (ABS)
Styrene-Acrylonitrile (SAN)
Polyvinyl Chloride (PVC)
Polycarbonate (PC)
High Density Polyethylene (HDPE)
Polyphenylene Oxide (PPO)

This unique forming technique has also been successfully used to laminate decorative expandable vinyl cover materials onto contoured plastic or fiberboard substrates by using a special class of adhesive, called thermoforming adhesives (see, e.g. Chan and Holnisch, Adhesives Age, Feb. 1986, pp 18-20). Typically, the adhesive is first applied to the contoured part by spray, and then dried. The vinyl is then thermoformed onto this adhesive coated surface. This process has been widely used for producing high quality, domestically appealing parts for the automotive industry and furniture trades. Some typical applications include thermoforming PVC film in the manufacture of automobile consoles, dashboards, door panels and other interior trim as well as in the production of decorative furniture facings.

A variety of adhesives can be used in this process including both organic solvent and water-based adhesives. However, in general, solvent-based adhesives are used more extensively since such systems cure faster, exhibit higher cured bonding strengths and exhibit higher "green strengths" than their water-based counterparts. "Green strength" as used herein is the ability of the adhesive to hold two surfaces together when first contacted and before the adhesive develops it ultimate bonding properties when fully cured. The degree of green strength exhibited by an adhesive is very important in many applications, including thermoforming. High green strength adhesives tend to prevent wrinkling and slippage of films during lamination.

For these reasons, the (organic) solvent-based adhesives are the standard adhesives used in the thermoforming industry. These solvents, however, are often flammable and/or toxic. As the regulation of workplace safety by federal, state, and local authorities becomes increasingly stringent, it will become difficult, if not impossible, to use such adhesives without costly vapor collection and containment systems.

What is needed is an adhesive which possess the desirable properties of the solvent-based systems (high cured bonding strength and high green strength) yet, which does not exhibit the drawbacks of toxicity and flammability commonly encountered with the use of organic solvents.

3. SUMMARY OF INVENTION

It is an object of this invention to provide an adhesive which is usable in the formation of thermoformed laminates. It is further an objective of this invention to provide an adhesive which has a high green strength, high lap shear strength, high ultimate bond strength, and a utility over a wide temperature range, yet which does not exhibit the problems of toxicity and flammability commonly encountered with the use of solvent-based adhesives.

This invention presents new water-based adhesives which can be used in thermoforming lamination processes. The adhesives are characterized by exceptionally high green and ultimate bonding strength and lap shear resistance. Their bonding performance properties, in fact, are superior to of the solvent-based and water-based standard industrial adhesives currently used in the thermoforming industry. Yet, being water-based, they do not exhibit the flammability and toxicity problems encountered when solvent-based adhesives are used.

Each adhesive-forming composition is comprised of an aromatic polyurethane which is emulsified or dispersed in water, and a compatible, i.e. water dispersible, cross-linking agent. The composition of the aromatic polyurethane can vary, but at least one aromatic substituent must be attached to each urethane subunit; the solids content in the emulsion or dispersion typically ranges from 10-60%. The amount of cross-linking agent employed must be sufficient to induce cross-linking of the polyurethane, and typically ranges from 0.1 to 20% (by weight) of the composition.

The adhesive use of other polymeric compositions forming the polyurethane is also anticipated composition can also contain an thickening agent to increase its viscosity to a desired value, to aid in its application to the non-expandable component in the thermoforming laminate system. While the amount will vary given the particular application, typically it ranges from 0.1 to 5% (by weight) of the composition.

Also permissible in the composition are colored pigments which can aid in the visualization of the adhesive coating during the application process. While the amount of pigment will vary given the particular pigment added and the degree of coloration desired, typically it ranges from 0.1 to 10% (by weight) of the total composition.

The composition of this invention can be used in a standard industrial thermoforming lamination process in place of a standard water or solvent-based adhesive-forming composition. In such a process, the adhesive forming composition is applied to the surface to which the laminate is to be affixed. The composition can be accomplished by any desired means (such as brushing, dipping, roll coating, or spraying), but the preferred means, adaptable to assembly lines, is spraying.

Once applied, the compound is dried to remove the water. Again, this drying can be accomplished at any desired temperature, and, of course, the drying time will be increased as the temperature is lowered. Once dried, the laminate layer can be applied by standard thermoforming means.

A particular benefit of the adhesives of this invention is that, due to their stability at the high temperatures in thermoforming and high green and ultimate bonding strength, they permit a simultaneous edge-folding to be performed during the thermoform lamination process. Thus, the expandable component can be laminated and edge-folded in a single step.

The laminated product, it has been found, exhibits bonding strength for superior to any adhesive currently in use, solvent or water-based. Furthermore, use of the water-based adhesives of this invention eliminates the problems of toxicity and flammability often encountered with the use of solvent-based adhesives in thermoforming lamination processes. Thus, use of the adhesive compounds disclosed by this invention permits thermoforming lamination process to be conducted easily and safely and produces a superior product.

4. DETAILED DESCRIPTION OF THE INVENTION

4.1. Water Based Adhesive-Forming Compositions

4.1.1. Aromatic Polyurethanes

The base component of the adhesives of this invention is a polyurethane composition comprised of urethane subunits, each subunit containing one or more aromatic substituents associated with it. This composition is contained in water and may be either in the form of an aqueous emulsion (where water is the continuous phase) or a *stabilized* aqueous dispersion (again, where water is the continuous phase), wherein the term "dispersions" includes dispersions of ionomers, polymers containing polar groups (which act as surfactants and stabilize the dispersions) as substituents. It is anticipated that various emulsion and dispersion stabilizers and surfactants will be associated with the composition to lend stability and prevent its separation. In either case, the solids content can be varied given the particular composition being utilized and the application for which it is employed; preferably, the solids content will range from 10 to 60% (by weight of the emulsion or dispersion).

Aromatic polyurethane emulsions and dispersions are commercially available under a variety of tradenames a representative list of such compound is presented below;

| Name | Supplier |
| --- | --- |
| Neorez R-9431 | Polyvinyl Chemicals, Inc. |
| Helastic WC-6998 | Wilmington Chemical |
| Dispercoll E-584, 8299 | Mobay |
| Desmocoll E-471 (KA-8066) | Mobay |
| QW-4476 | K.J. Quinn |
| Milloxane 280 | Polyurethane Specialties |
| Milloxane 5HS | Polyurethane Specialties |

In addition to these, any number of aromatic polyurethane-in-water emulsions and dispersions will be suitable for incorporation into the adhesives of this invention. Also, blending of other polymers such as nitriles, acrylates, etc. with the polyurethane system to lower costs is possible.

4.1.2. Cross-Linking Agents

The only other active component in the adhesives of this invention is the cross-linking agent. This agent is responsible for the high temperature resistance and high bond strength properties of these compositions, which arise due to the cross-linking of the polyurethane components. For the invention to be effective, the cross-linking agent must be water-dispersible and stable in the presence of water to have a practical pot-life as the application dictates; yet it must also be capable of inducing cross-linking at room temperature. Furthermore, the cross-linking must occur at a rate sufficiently slow to permit the composition to remain stable prior to use (i.e. the time between the initial mixing and when the cross-linking reaches a point such that the adhesive properties are lost, must be long), yet not so slow as to have an undesirably low ultimate bond strength.

One class of compounds which meet these criteria are organic isocyanates, particularly the aliphatic polyisocyanates. While many of these compounds are water-reactive, others can be readily dispersed in water and will exhibit desirable cross-linking properties. Such compounds are available under a variety of tradenames including but not limited to, the following:

| Name | Supplier |
| --- | --- |
| Desmodur KA-8365 | Mobay |
| Rubinate MF-178 (modified methylene diisocyanate) | Rubicon Chemical |
| Isocet Cx-10 | Ashland |

Other cross-linking agents exhibiting similar properties can also be utilized.

The precise concentration of the cross-linking agent in the overall composition will vary given the particular agent utilized and the application for which it is employed. Preferably, the concentration will range from 0.1 to 20% (by weight) of the total composition.

4.1.3. Rheology Control Agents

For certain applications, it may be advantageous to have a higher viscosity composition. Such increased viscosity can be a definite advantage when, for example, the adhesive forming composition is applied to a sloped or vertical surface, since it will reduce its tendency to run-off.

For these applications, a viscosity-increasing agent in the form of thickener can be compounded into the adhesives of this invention. Such components can be utilized to increase the viscosity of the adhesive-forming composition to a desired level. While the amount of thickener in the composition will vary given the particular application, it preferably ranges from 0.1 to 5% (by weight) of the composition.

One class of thickeners useful in these compositions are acrylate thickeners such as Acrysol S and Acrysol TT 678 of Rohm and Haas, and RES 6038 of Union 76. A wide range of other thickeners compatible with the compositions are available under a variety of tradenames. These include, but are not limited to, the following:

| Name | Supplier |
| --- | --- |
| QP1500 | Union Carbide |
| Collacral VL | BASF |

Other thickeners compatible with the system can also be used.

4.1.4. Pigments

In some applications, it may be particular advantageous to visualize the adhesive forming composition. This is particularly important if the adhesive is used in a thermoforming lamination process and the panels are visually inspected to determine if the adhesive is evenly applied.

For these applications, pigments can be incorporated into the compositions. Virtually any compatible pigment can be used, the main criterion being that it remain unreactive with the other adhesive components. While the precise quantity of pigment added will be dictated by the actual compound used and the degree of coloration desired, it preferably will range from 0.1 to 10% of the composition.

A wide variety of compatible pigments are available commercially for use in this invention. These include, but are not limited to, the Flexiverse pigments marketed by Sun Chemical under the following designations:

| Color | Product |
| --- | --- |
| Black | Flexiverse Black LFD-4343 |
| Red | Flexiverse Red RFD-3217, RWD-1170, RFD-5104, RFD-4347 |
| Blue | Flexiverse Blue BFD-1149 |

4.1.5. Compositions

The adhesive-forming compositions of this invention are preferably prepared in two parts: Part A contains the aromatic polyurethane emulsion (or dispersion) and the thickener and pigment (if any); Part B contains the cross-linking agents. Immediately prior to use (or as close to this time as practical) the two parts are mixed at room temperature and the blended composition is applied to the desired surface.

In a preferred embodiment of this invention, the composition is comprised of the following:

| Ingredients | Supplier | Part (by weight) |
| --- | --- | --- |
| PART A | | |
| Neorez R-9431 (a 35% solids content aromatic polyurethane in water emulsion) | Polyvinyl Chemical | 100.0 |
| Acrysol TT-678 (an acrylate thickener) | Rohm & Haas | 0.5 |
| Flexiverse Black LFD 4343 (a carbon black pigment) | Sun Chemical | 0.1 |
| | Total: | 100.6 |
| PART B | | |
| Desmodur KA-8365 (a solvent free aliphatic polyisocyanate) | Mobay | 5.0 |

When parts A and B are mixed, the composition has a high green strength, and has a pot-life in excess of 7 hours. Furthermore, the viscosity of the composition is sufficiently high to permit application by brushing, yet low enough to permit spray application. In thermoforming lamination processes, also characterized by its high green strength, high lap shear strength, high ultimate bond strength, and wide service temperature, which covers a wide range from −22° F. to 212° F. This adhesive also permits for edge trimming and folding immediately after removal for thermoforming equipment. In addition, it permits simultaneous edge-folding during the thermoforming process (allowing for a one-step process) due to its high green and ultimate bond strengths. This process is important in the automotive industry and has heretofore been possible only with solvent based adhesive. Its adhesive performance is, thus, superior to that of current industrial standard adhesives, both solvent and water-based.

4.2. Use of Adhesive-Forming Compositions in Thermoforming Lamination Processes The adhesive-forming compositions of this invention can be employed in place of the water and solvent-based adhesives currently used by industry in such standard processes. The compositions of this invention will form laminates of particularly high bonding strength, yet do not exhibit the toxically and flammability problems commonly encountered with solvent-based adhesives.

When employed in such a process the blended adhesive forming composition (Parts A and B) of this invention is applied to the surface of the non-expandable (rigid) component. Being water-based, the composition is compatible with a variety of substances including wood, particle boards, chipboards, and most plastics. Once applied, the water is removed by drying, either at room temperature or elevated temperature. While drying can be accomplished at any temperature, the drying temperature should be chosen based on the properties of the adhesive composition (i.e., its pot life and its thermal stability) as drying at lower temperatures requires longer times. For the preferred adhesive described in section 4.1.5, the drying can be accomplished by incubating the composition for 5–30 minutes at room temperature, followed by incubation in an oven at 100° C. for 2–15 minutes.

Once the adhesive has dried, the lamination can be accomplished by standard thermoforming means. The final product is a laminate of unusually high bond strength and peel/lap-shear resistance.

5. EXAMPLES

5.1. Thermoforming Adhesive Properties of a Standard Water-Based Adhesive

In order to illustrate the properties of the water-based thermoforming adhesive, a Rohm and Haas 2 part acrylic water-based adhesive (E-2128/2129) was used. For each test, the adhesive was prepared according to the manufacturers directions and a thin coat of adhesive was brushed or sprayed to the rough side of a flat Royalite R-20 ABS panel. It was allowed to air dry at room temperature for 5-25 minutes, and then oven dried at 170°-220° F. for 5 minutes. A vinyl sheet was heated to 310°-320° F. and then vacuum formed onto the adhesive coated side of the ABS panel.

The panels were then examined for peel and lap shear in accordance with the procedures set forth in ASTM procedures D-413 (peel) and D-816 (lap-shear). Briefly, 1" wide strips were cut for the peel testing and 1" squares were used for lap testing. Testing was accomplished on a Instron tensile strength tester with the jaw speed set at 2"/min; for the peel test, the 180° peel mode was used. Tests were conducted after incubation at room temperature (25° C.) for the specified amount of time; the samples were then examined either at 25° C. or heated to 100° C. immediately prior to testing. The results are summarized in Table I.

TABLE I

| Incubation | Test @ 2 in./min. | |
|---|---|---|
| | 25° C. | 100° C. |
| 180° Peel | Test Result (lb./in width) | |
| Initial @ RT | 3.8 CF | — |
| 24 hrs. @ RT | 4.0 CF | 0.9 CF |
| 3 Days @ RT | — | 0.6 CF |
| 7 Days @ RT | — | 0.4 CF |
| Lap Shear | Test Result (lb./in.$^2$) | |
| Initial @ RT | 20.5 CF | — |
| 24 hrs. @ RT | — | 3.5 CF |
| 3 Days @ RT | — | 4.0 CF |
| 7 Days @ RT | — | 3.0 CF |

CF indicates cohesive failure of the adhesive

As shown, the adhesive exhibited cohesive failure in all tests. Since cohesive failure is evidence of a lack of structural integrity (the adhesive was found on both the panel surface and the laminate), the adhesive is relatively weak and any laminate can be easily removed.

5.2. Preparation of New Thermoforming Adhesive

The adhesive was initially prepared in two parts. Part A was prepared as a mixture of:

| 100 parts (by wt) | Neorey R-9431 (solids content 35%) |
|---|---|
| 0.5 parts | Acrysol TT-678 |
| 0.1 parts | Flexiverse Black LFD 4343 |

Part B was Demodur KA 8365.

Prior to each experimental series, the parts were combined in the ratio 5 parts B/100 parts A and stirred 10-20 minutes at room temperature. Unless otherwise specified, the adhesive was then immediately applied to the test panels, after which the water was removed by drying for about 5 minutes at room temperature and an additional 5 minutes in an oven at 100° C.

Laminates were unless otherwise stated, prepared immediately after the drying.

5.3. Thermoforming Properties of the New Adhesive

The adhesive prepared in example 5.2 was subjected to the lap and peel tests following the procedure described in example 5.1. The results are presented in Table II.

TABLE II

| Incubation | Test @ 2 in./min. | |
|---|---|---|
| | 25° C. | 100° C. |
| 180° Peel | Test Result (lb./in width) | |
| Initial @ RT | 16.0 AF | — |
| 24 hrs. @ RT | 26.0 VT | 3.3 AF |
| 3 Days @ RT | — | 3.6 AF |
| 7 Days @ RT | — | 3.4 AF |
| Lap Shear | Test Result (lb./in.$^2$) | |
| Initial @ RT | 32.0 VT | — |
| 24 hrs. @ RT | — | 7.3 AF |
| 3 Days @ RT | — | 6.8 AF |
| 7 Days @ RT | — | 8.9 VT |

AF = Adhesive Failure
VT = Vinyl Tear

As shown, the adhesive did not exhibit cohesive failure in any trial, and was stable to much higher peel and shear forces than the example 5.1 adhesive. When failure did occur, the mode was always either an adhesive failure (where the adhesive remains bound to the Royalite panel) or by tearing the vinyl laminate. Both of these failure modes attest to the high degree of structural integrity of the adhesive.

5.4. Effect of Eliminating Polyisocyanate from the Adhesive

For this example, the adhesive of Example 5.2 was prepared without the inclusion of Part B; all other procedures remained the same. The results of the peel and lap tests are presented in Table III.

TABLE III

| Incubation | 25° C. | 100° C. |
|---|---|---|
| 180° Peel | Results (lb./in. width) | |
| Initial @ RT | 16.0 AF | — |
| 24 hrs. @ RT | 19.0 VT | 1.3 CF |
| 3 Days @ RT | — | 1.0 CF |
| 7 Days @ RT | — | 1.0 CF |
| Lap Shear | Results (lb./in$^2$) | |
| Initial @ RT | 34.0 VT | — |
| 24 hrs. @ RT | — | 4.4 CF |
| 3 Days @ RT | — | 4.0 CF |
| 7 Days @ RT | — | 4.0 CF |

The results clearly demonstrate that the inclusion of polyisocyanate (component B) is necessary for the high temperature performance, as evidenced by the cohesive failures observed in the 100° C. trials.

5.5. Effect of Varying Polyisocyanate Content

This test series was conducted on the base composition described in example 5.2, containing varying amounts of polyisocyanate (Part B). The samples were prepared as described in 5.2, and incubated at room temperature for the indicated amount of time. The results are presented in Table IV.

TABLE IV

| Incubation | Test Temp | Polyisocyanate Level (parts/100 part) | | | | | | |
|---|---|---|---|---|---|---|---|---|
| | | 0 | 1 | 3 | 4 | 5 | 6 | 8 |
| 180° Peel | | Results (lb./in. width) | | | | | | |
| Sample Condition | | | | | | | | |
| Initial | 25° C. | 16 | 18 | 15 | 16 | 16 | 13 | 14 |
| 24 hr. | 25° C. | 19 VT | — | 19 VT | 25 VT | 22 VT | 22 VT | — |
| 24 hr. | 100° C. | 1.3 | — | 2.4 | 2.5 | 3.3 | 2.9 | — |
| 7 Days | 100° C. | 1.0 | — | 3.4 | 3.0 | 3.4 | 3.0 | — |
| Lap Shear | | Results (lb./in.²) | | | | | | |
| Initial | 25° C. | 34 | — | 37 VT | 36 VT | 32 VT | 35 VT | — |
| 24 hr. | 100° C. | 4.4 | — | 6.8 | 6.5 | 7.3 | 7.6 | — |
| 7 Days | 100° C. | 4.0 CF | — | 7.5 VT | 7.5 VT | 8.9 VT | 5.0 VT | — |

As shown, all compositions exhibited a high strength, even at 1% polyisocyanate; the only cohesive failure was observed in the lap shear test for the 0% sample (note: where the failure mode is not specified, the failure was predominantly via adhesive failure.

The force values in Table IV suggest that a wide range of polyisocyanate levels can be used in accordance with this invention to improve the high temperature performance of the polyurethane composition. The data also suggests that the optimum level is 5 parts Part B per 100 parts of Part A.

5.6. Stability of Mixed Adhesive

This test series was conducted to assess the performance of the adhesive as a function of time (pot life) after polyisocyanate is added. The sample was prepared as described in Example 5.2. Peel and shear samples were prepared and conditioned in the same fashion discussed in Example 5.1, except that fiberboard panels were substituted for the Royalite ABS ones. The results are presented in Table V:

TABLE V

| Incubation (at RT) | Test Temp | Hours After Mixing | | | | | | |
|---|---|---|---|---|---|---|---|---|
| | | 1 | 2 | 3 | 4 | 5 | 6 | 7 |
| 180° Peel | | Results (lb./in. width) | | | | | | |
| Sample Condition/Tested | | | | | | | | |
| 24 hr. | 25° C. | 8.2 FT | 5.0 FT | 5.6 FT | 7.2 FT | 5.6 FT | 7.4 FT | 6.0 FT |
| 24 hr. | 100° C. | 2.3 FT | 3.1 FT | 2.3 FT | 3.0 FT | 2.2 FT | 2.3 FT | 2.1 FT |
| 15 days | 100° C. | 3.6 FT | 3.4 FT | 2.6 FT | 2.8 FT | 2.8 FT | 2.5 FT | 1.9 FT |
| Lap Shear² | | Results (lb./in.²) | | | | | | |
| 24 hr. | 25° C. | 38.5 VT | 32.0 VT | 32.0 VT | 33.0 VT | 35.5 VT | 36.5 VT | 34.0 VT |
| 24 hr. | 100° C. | 7.1 FT | 8.5 FT | 8.9 FT | 8.8 FT | 10.0 FT | 8.6 FT | 7.9 VT |
| 15 days | 100° C. | 8.6 FT | 9.4 VT | 7.8 VT | 8.4 VT | 8.4 VT | 7.0 VT | 7.2 VT |

FT = Fiber Tear (a tear in the fiberboard panel)

The results reveal that even 7 hours after blending, the adhesive still performs well, exhibiting high bonding strength.

5.7. Effect of Open Time or Adhesive Performance

This test series was conducted to assess the performance of the adhesive as a function of open time (time elapsed after the adhesive has been dried and before thermoforming). The adhesive was prepared as described in example 5.1. Peel samples were prepared and conditioned at room temperature for 24 hours in the same fashion discussed in Example 5.1. The 800 peel test results are presented in Table VI:

TABLE VI

| Open Time (hours) | 25° C. Results (lb/in width) | 100° C. |
|---|---|---|
| 0.5 | 18.3 VT | 1.6 AF |
| 1.0 | 21.3 VT | 1.7 AF |
| 2.0 | 18.0 VT | 2.2 AF |
| 3.5 | 15.0 VT | 1.8 AF |
| 5.0 | 22.0 VT | 2.0 AF |

As shown, the bonding strength remains high, even after 5 hours.

5.8. Effect of Heat Cycles

This test series was conducted to assess the adhesive performance the bonded finished laminate; the finished laminate system was subjected to the following heat cycles:

Cycle A

2½ hr. @100° F. (38° C.)/100% RH
2½ hr.@ −22° F. (−30° C.)
3 hr.@212° F. (100° C.)

Cycle B 3 hr.@200° F. (93° F.)
2½ hr.@100° F. (38° C.)/100% RH
2½ hr.@ −20° F. (−29° C.)

The adhesive was prepared as described in Example 5.2. Peel and shear samples were prepared in the same fashion discussed in Example 5.1, except that an ABS door panel was used under actual production conditions; the bonded system were incubated room temperature for 24 hours prior to testing and all tests were conducted at room temperature. Tests results are summarized in Table VII:

TABLE VII

| | 25° C. Results | 100° C. Results |
|---|---|---|
| 180° Peel (lb./in.) | | |
| Control | 15.6 VT | 2.4 |
| Cycle A | 14.0 VT | 0.8 |
| Cycle B | 13.5 VT | 0.9 |

TABLE VII-continued

| | 25° C. Results | 100° C. Results |
|---|---|---|
| Lap Shear (lb./in.$^2$) | | |
| Control | 27.0 VT | 8.0 |
| Cycle A | 31.0 VT | 5.4 |
| Cycle B | 27.0 VT | 5.8 |

As shown, the adhesive performed satisfactorily after being exposed to both cycles (note: where failure mode is not specified, it was predominantly via adhesive failure).

For comparison purposes, a similar experimental was conducted on a solvent-based standard industrial adhesive which has been successfully used in the manufacture of consoles, dashboards, door panels for automotive and furniture facings, 3M PB 4801 Adhesive. The test conditions were the same as above and the results are presented in Table VIII:

TABLE VIII

| | 25° C. Results | 100° C. Results |
|---|---|---|
| 180° Peel (lb./in.) | | |
| Control | 7.5 | 1.3 |
| Cycle A | 3.7 | 0.9 |
| Cycle B | 5.0 | 1.0 |
| Lap Shear (lb./in.$^2$) | | |
| Control | 33.0 VT | 5.6 |
| Cycle A | 28.5 VT | 5.5 |
| Cycle B | 30.0 VT | 4.8 |

A comparison of the bonding strength data reveals that the water-based solvent of this invention, performs better than a standard solvent-based adhesive under the same conditions.

5.9. Viscosity Versus Time Profile for the Adhesive

To assess the effect of prolonged standing after blending, two samples of adhesive were prepared as described in section 5.2., and the viscosity of each was measured periodically on a RVF Brookfield Viscometer at 74° F. using a number 4 spindle at 10 rpm. The viscosity of the first sample was measured without any modification, while the second sample was agitated prior to the measurement. The results are presented in Table IX:

TABLE IX

| | Viscosity Study Brookfield Viscosity (CPS) | |
|---|---|---|
| Incubation Time RT (Hours) | A Without Mixing | B With Mixing |
| 0 | 2,000 | 1,700 |
| 1 | 3,700 | 2,300 |
| 2 | 4,500 | — |
| 3 | 6,400 | 2,800 |
| 4 | 8,500 | 2,500 |
| 5 | 8,800 | 2,700 |
| 6 | 9,400 | — |
| 7 | 10,400 | — |
| Overnight | 17,500 | 3,000 |

The results demonstrate the viscosity of the adhesive and, thus, the sprayability of material remains relative constant throughout pot life with mixing. Thus, the adhesive acts like a thixotrope and agitation will reduce viscosity.

5.10. Effect of Variation of Drying Conditions

The effect of variation in drying time and temperature was examined in this test series. Briefly, the adhesive was prepared as described in section 5.2, and was applied to fiberboard panes. Each panel was then subjected to a different drying condition, after which PVC was thermoform laminated onto the coated surfaces. After a 24 hour incubation at ambient temperature, the laminates were subject to the 180° Peel test. The results are summarized in Table X:

TABLE X

| Sample | Temp. (°F.) | Time (Min.) | Adhesive Wet Wt. (gm/100 sq. in) | RT Peel (lb./in width) |
|---|---|---|---|---|
| A | 200 | 2 | 5.8 | 1.3 FT |
| B | 200 | 4 | 7.8 | 0.7 FT |
| C | 200 | 6 | 6.8 | 1.3 FT |
| D | 190 | 2 | 6.0 | 0.7 FT |
| E | 190 | 4 | 7.1 | 0.9 FT |
| F | 190 | 6 | 6.0 | 1.1 FT |
| G | 170 | 2 | 6.2 | 1.1 FT |
| H | 170 | 4 | 6.1 | 0.9 FT |
| I | 170 | 6 | 6.7 | 0.4 FT |
| J | 150 | 2 | 7.0 | 1.4 FT |
| K | 150 | 4 | 6.7 | 0.3 FT |
| L | 150 | 6 | 7.1 | 0.9 FT |

As shown, over the side range of drying times and temperatures examined, the adhesive exhibited high bond strength as evidenced by the fiber tears observed.

It is apparent that many modifications and variations of this invention as hereinabove set forth may be made without departing from the spirit and scope thereof. The specific embodiments described are given by way of example only, and the invention is limited only by the terms of the appended claims.

What is claimed is:

1. An adhesive forming composition comprising:
   (a) an aqueous aromatic polyurethane emulsion or dispersion comprising a polyurethane compound of repeating urethane subunits, each having at least one aromatic substituent associated therewith; and
   (b) an effective amount of a cross-linking agent which is water-dispersible and stable in the presence of water yet being able to induce cross-linking of the polyurethane at room temperature at a rate sufficient to permit the composition to form an adhesive having suitable ultimate bond strength and green strength;
said emulsion or dispersion having a sufficient solids content to enable the resultant adhesive to join and hold components together.

2. The adhesive-forming composition of claim 1 wherein the emulsion or dispersion has a solids content ranging from 10–60%.

3. The adhesive-forming composition of claim 1 wherein the amount of cross-linking agent is between 0.1 and 20%, by weight, of the composition.

4. The adhesive-forming composition of claim 1 further comprising an effective amount of a thickener to increase the viscosity of said composition.

5. The adhesive-forming composition of claim 4 wherein the amount of thickener is between 0.1 and 5%, by weight, of the composition.

6. The adhesive-forming composition of claim 1 further comprising an effective amount of pigment to impart a color to said composition.

7. The adhesive-forming composition of claim 6, wherein the amount of pigment is between 0.1 and 10% by weight, of the composition.

8. The adhesive-forming composition of claim 1 wherein the cross-linking agent is a solvent-free, water-dispersible, unblocked organic isocyanate compound.

9. The adhesive-forming composition of claim 8 wherein the organic isocyanate compound is an aliphatic polyisocyanate.

10. A cross-linked polyurethane adhesive formed from the adhesive forming composition of claim 1.

11. The adhesive composition of claim 4 wherein the thickener is an acrylate thickener.

12. An adhesive-forming composition comprising:
   (a) an aqueous aromatic polyurethane emulsion or dispersion comprising a polyurethane compound of repeating urethane subunits, each having at least one aromatic substituent associated therewith; and
   (b) an effective amount of a cross-linking agent of a solvent-free, water-dispersible, unblocked organic isocyanate compound which is able to induce cross-linking of the polyurethane at room temperature at a rate sufficient to permit the composition to form an adhesive having suitable ultimate bond strength and green strength; said emulsion or dispersion having a sufficient solids content to enable the resultant adhesive to join and hold components together.

13. The adhesive-forming composition of claim 12 wherein the emulsion or dispersion has a solids content ranging from 10–60%.

14. The adhesive-forming composition of claim 12 wherein the amount of cross-linking agent is between 0.1 and 20% by weight, of the composition.

15. The adhesive-forming composition of claim 12 further comprising an effective amount of a thickener to increase the viscosity of said composition.

16. The adhesive-forming composition of claim 12 wherein the thickener is an acrylate.

17. The adhesive-forming composition of claim 15 wherein the amount of thickener is between 0.1 and 5%, by weight, of the composition.

18. The adhesive-forming composition of claim 12 further comprising an effective amount of a pigment to impart a color to said composition.

19. The adhesive-forming composition of claim 18 wherein the amount of pigment is between 0.1 and 10% by weight, of the composition.

20. The adhesive-forming composition of claim 12 wherein the organic isocyanate compound is an aliphatic polyisocyanate.

21. A cross-linked polyurethane adhesive formed from the adhesive forming composition of claim 12.

22. An adhesive-forming composition comprising:
   (a) an aqueous aromatic polyurethane emulsion or dispersion comprising a polyurethane compound of repeating urethane subunits, each having at least one aromatic substituent associated therewith;
   (b) a cross-linking agent in an amount of between 0.1 and 20%, by weight of the composition, of a solvent-free, water-dispersible, unblocked organic isocyanate compound which is able to induce cross-linking of the polyurethane at room temperature at a rate sufficient to permit the composition to form an adhesive having suitable ultimate bond strength and green strength;
   (c) between 0.1 and 5%, by weight of the composition, of a thickener to increase the viscosity of the composition; and
   (d) between 0.1 and 10%, by weight of the composition, of a pigment to impart a color to the composition; said emulsion or dispersion having a solids content of between 10 and 60% to enable the resultant adhesive to join and hold components together.

23. The adhesive-forming composition of claim 22 wherein the thickener is an acrylate.

24. The adhesive-forming composition of claim 22 wherein the organic isocyanate compound is an aliphatic polyisocyanate.

25. A cross-linked polyurethane adhesive formed from the adhesive forming composition of claim 22.

* * * * *